United States Patent
Bolshakov et al.

(10) Patent No.: US 12,461,283 B2
(45) Date of Patent: Nov. 4, 2025

(54) OPTICAL ARTICLE WITH VERY LOW REFLECTION IN THE VISIBLE REGION AND IN THE NEAR INFRARED REGION

(71) Applicant: Essilor International, Charenton-le-Pont (FR)

(72) Inventors: Ilya Bolshakov, Dallas, TX (US); William Trottier-Lapointe, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 378 days.

(21) Appl. No.: 17/922,891

(22) PCT Filed: May 6, 2021

(86) PCT No.: PCT/EP2021/062028
§ 371 (c)(1),
(2) Date: Nov. 2, 2022

(87) PCT Pub. No.: WO2021/224405
PCT Pub. Date: Nov. 11, 2021

(65) Prior Publication Data
US 2023/0176255 A1 Jun. 8, 2023

(30) Foreign Application Priority Data
May 7, 2020 (EP) .................................... 20305459

(51) Int. Cl.
*G02B 1/115* (2015.01)
(52) U.S. Cl.
CPC .................................... *G02B 1/115* (2013.01)
(58) Field of Classification Search
CPC ............ G02B 1/115; G02B 2027/0118; G02B 27/0101; G02B 27/01
See application file for complete search history.

(56) References Cited

U.S. PATENT DOCUMENTS

| 7,901,870 B1 | 3/2011 | Wach et al. |
| 2009/0080077 A1 | 3/2009 | Lin |

(Continued)

FOREIGN PATENT DOCUMENTS

| DE | 4100831 | 8/1991 |
| EP | 2685293 | 1/2014 |

(Continued)

OTHER PUBLICATIONS

International Search Report and Written Opinion issued in Corresponding PCT Application No. PCT/EP2021/062028, dated Jul. 23, 2021.

(Continued)

*Primary Examiner* — Balram T Parbadia
(74) *Attorney, Agent, or Firm* — Norton Rose Fulbright US LLP

(57) ABSTRACT

The invention relates to an optical article comprising a transparent substrate with a front main face and with a rear main face, at least one of the main faces being coated with a multilayered interferential coating comprising a stack of at least one high refractive index layer (HI) having a refractive index higher than or equal to 1.55 and at least one low refractive index layer (LI) having a refractive index layer lower than 1.55, characterized in that said multilayered interferential coating has a mean reflection factor for wavelengths ranging from 445 nm to a predetermined maximum wavelength higher than or equal to 1185 nm, noted $R_m$ $_{(445\text{-}\geq 1185)}$, that is lower than or equal to 2.9%, preferably 2.6% at an angle of incidence lower than or equal to 45°.

19 Claims, 2 Drawing Sheets

(56) References Cited

U.S. PATENT DOCUMENTS

| | | | |
|---|---|---|---|
| 2011/0120554 A1* | 5/2011 | Chhajed | C09D 1/00 |
| | | | 428/113 |
| 2013/0308196 A1* | 11/2013 | Koyama | G02B 1/115 |
| | | | 359/601 |
| 2014/0322502 A1* | 10/2014 | Koyama | G02B 1/11 |
| | | | 428/212 |
| 2016/0154254 A1 | 6/2016 | Bolshakov et al. | |
| 2018/0275316 A1 | 9/2018 | Bolshakov et al. | |
| 2021/0286106 A1* | 9/2021 | Kim | G02B 1/11 |

FOREIGN PATENT DOCUMENTS

| | | |
|---|---|---|
| JP | 2711697 B2 | 2/1998 |
| JP | 2012255984 | 12/2012 |

OTHER PUBLICATIONS

Anders, Hugo, "Dünne Schichten für die Optik", Optik und Feinmechanik in Einzeldarstellungen, Stuttgart: Wissenschaftliche Verlagsgesellschaft, 1965, pp. 54 (German only).

Lemarquis et al., "Broadband antireflection coatings for visible and infrared ranges", CEAS Space Journal, 2019, pp. 567-578.

Macleod, H. Angus, "Thin-Film Optical Filters", Institute of Physics Publishing Bristol and Philadelphia, 1986, pp. 150-153.

Kaiser, "Old rules useful to the designer of optical coatings", *Vakuum in Forschung und Praxis*, 2007, vol. 19, Issue 4 / pp. 17-23. (German with English Abstract).

Morton et al., "Design and Development of Optical Coatings on Laser Bar Facets", *Proc. SPIE 5280, Materials, Active Devices, and Optical Amplifiers*, 2004, 11 pages.

Screenshot of "Optical Coating Design with the Essential Macleod", User's Manual, 2021, Version 10.1, (https://llibrary.net/article/a-word-about-data-filesessential-macleod.y6lop37q).

Third Party Observations issued in corresponding European Application No. 21722927.7, dated Aug. 8, 2025.

* cited by examiner

OPTICAL ARTICLE WITH VERY LOW REFLECTION IN THE VISIBLE REGION AND IN THE NEAR INFRARED REGION

CROSS-REFERENCE TO RELATED APPLICATIONS

This application is a national phase application under 35 U.S.C. § 371 of International Application No. PCT/EP2021/062028 filed 6 May 2021, which claims priority to European Patent Application No. 20305459.8 filed 7 May 2020. The entire contents of each of the above-referenced disclosures is specifically incorporated by reference herein without disclaimer.

FIELD OF THE INVENTION

The present invention relates to an optical article comprising a multilayered interferential coating, and especially an antireflective coating which strongly reduces reflection both in the visible region and in the near infrared (NIR) region, that is to say for wavelengths ranging approximately from 400 to 1200 nm, and preferably from 400 to 1000 nm. The optical article may especially be an ophthalmic lens, such as a spectacle lens.

The present invention also relates to an optical device comprising said optical article and that may be suitable for instance for forming an augmented reality device, a virtual reality device or an eye tracking device.

DESCRIPTION OF RELATED ART

The NIR range is commonly used for light illuminating the eye for the purpose of eye tracking, because NIR light is not visible by the user and, at the same time, allows very good contrast on the pupil, which makes it possible to obtain high accuracy and high reliability of eye gaze direction or eye motion measurements, or of any other measurements such as relating to pupil size and position, eye reflections on cornea surfaces, eye lens surfaces, eye lid, etc.

Such measurements may be made through specific optical device, comprising a deep red and NIR light source and a video camera, in addition to ophthalmic lenses.

However, when the deep red and NIR light source sends light towards the eye of a user wearing such equipment, multiple reflections occur on the faces of the ophthalmic lenses. Such multiple reflections generate noise for the detector of the camera, which will then be unable to properly locate the pupil.

Thus, it is necessary to limit the deep red and NIR light reflections on the ophthalmic lenses.

In addition, due to the geometry setup of such optical device intended to be used for instance in the new digital applications, such as augmented reality (AR) or virtual reality (VR), NIR performance is especially important at a high angle of incidence that is typically higher than or equal to 45°.

In addition, it is also important for the wearer comfort of the ophthalmic lenses to limit the reflection in the visible region ranging from 380 nm to 780 nm.

Typical antireflective coatings on the marking do not have a large wavelength broadband ranging from 400 to 1200 nm, preferably from 400 to 1000 nm. Especially, they do not enable to obtain a very low reflection for wavelengths ranging from 400 to 1200 nm, preferably from 400 to 1000 nm and especially at a high angle of incidence such as above 35°.

Therefore there is a need to provide novel interferential coatings having both very good antireflective properties in the visible region and in the NIR region whatever the angle of incidence (for instance from 0° to) 60°.

Also, there is a need to provide such novel interferential coatings having preferably at the same time robustness properties and aesthetic appearance (i.e. color achromaticity) and this, whatever the angle of incidence.

SUMMARY OF THE INVENTION

An object of the invention is therefore to remedy the above drawbacks, by seeking to develop a transparent optical article, especially an ophthalmic lens such as spectacle lens, comprising a substrate in mineral or organic glass comprising at least an interferential coating, such an antireflective coating, said antireflective coating possessing very good antireflective performances in the visible region, while having also very low reflection in the NIR region and to do so without compromising the economic and/or industrial feasibility of its manufacture.

The invention therefore relates to an optical article, preferably an ophthalmic lens, comprising a transparent substrate with a front main face and with a rear main face, at least one of the main faces being coated with a multilayered interferential coating (especially a multilayered antireflective) coating comprising a stack of at least one high refractive index layer (HI) having a refractive index higher than or equal to 1.55 and at least one low refractive index layer (LI) having a refractive index layer lower than 1.55, characterized in that said multilayered interferential coating has a mean reflection factor for wavelengths ranging from 445 nm to a predetermined maximum wavelength at least equal to or higher than 1185 nm, noted $R_{m\ (445-\geq1185)}$, that is lower than or equal to 2.9%, preferably 2.6% at an angle of incidence lower than or equal to 45°.

In general, the predetermined maximum wavelength ranges from 1185 nm to 1200 nm and may correspond for instance to 1185 nm or 1200 nm.

Therefore, the optical article according to the invention comprises a highly efficient antireflective (AR) coating with very low reflection in both the visible region and the NIR region.

The invention also provides an optical device that may be an augmented reality device, a virtual reality device and an eye tracking device, comprising such an optical article and a light source emitting in the deep red and near infrared region.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1:
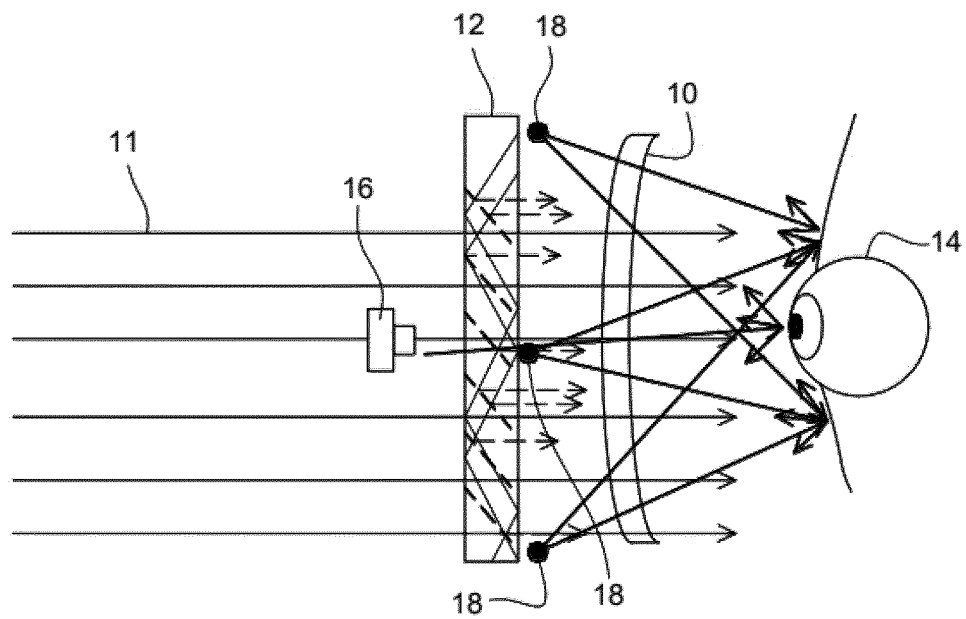
FIG. 1 is a schematic view of an augmented reality device or virtual reality device comprising an optical device according to the present invention, in a particular embodiment.

In the description which follows, the drawing figures are not necessarily to scale and certain features may be shown in generalized or schematic form in the interest of clarity and conciseness or for informational purposes. In addition, embodiments discussed herein are merely representative and do not limit the scope of the invention.

1. Definitions

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, reaction conditions, etc. used herein are to be understood as modified in all instances by the term "about."

Also unless otherwise indicated, the indication of an interval of values "from X to Y" or "between X to Y", according to the present invention, means as including the values of X and Y. In addition, unless otherwise indicated, for an interval of values, the expression "lower than X" or "higher than Y", does not comprise the value of X or Y.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

According to the embodiments described hereafter, the multilayered interferential coating is preferably a multilayered antireflective coating. Hence, for the rest of the description, these two terms are similar.

By outermost layer of the multilayered antireflective coating, it is meant the layer of the anti-reflection (AR) coating which is the furthest from the substrate.

By innermost layer of the multilayered antireflective coating, it is meant the layer of the anti-reflection coating which is the closest to the substrate.

By inner layer of the multilayered antireflective coating, it is meant any layer of the anti-reflection coating except for the outermost layer of said AR coating.

Also, unless stated otherwise, all thicknesses disclosed in the present application relate to physical thicknesses.

The terms multilayered antireflective coating or AR coating and AR stack have the same meaning.

Unless otherwise specified, the refractive indexes referred to in the present application are expressed at 25° C. at a wavelength of 550 nm.

The multilayered antireflective coating according to the invention may be formed on at least one of the main faces of a bare substrate, i.e. an uncoated substrate, or at least one of the main faces of the substrate already coated with one or more functional coatings, such as an anti-abrasion coating.

As used herein, the rear (or the inner or Concave or CC) face of the substrate is intended to mean the face which, when using the article, is the nearest from the wearer's eye. It is generally a concave face. On the contrary, the front face of the substrate (or Convex or CX), is the face which, when using the article, is the most distant from the wearer's eye. It is generally a convex face.

Also, as used herein, a "transparent substrate" is understood to be transparent, when the observation of an image through said substrate is perceived with no significant loss of contrast, that is, when the formation of an image through said substrate is obtained without adversely affecting the quality of the image.

The term cosmetic appearance means that there is no, or almost no, cosmetic defects over time evaluated visually in transmission and is preferably measured under an arc lamp.

The term "robustness" of an optical article, such as an ophthalmic lens, in the present invention is defined as the ability of this lens to resist change despite the variations induced by its manufacture process. These variations depends, for instance, on the type of substrate which is used, the setting of the manufacturing machine (temperature schedule, appropriate time, setting of the electron gun . . . ) and/or its usage mode, the replacement of said manufacturing machine by another one.

Indeed, when a multilayered antireflective coating is manufactured at industrial scale, some thickness variations for each layer generally occur. These variations lead to different reflection performance, and especially different perceived residual reflected color of the multilayered antireflective coating. If the perceived residual reflected color of the antireflective coating of two lenses is different, these lenses will appear different and will not be able to be associated in pair.

According to the invention, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b* (1976). Generally the angle of incidence changes from 0° (normal incidence) to 90° (grazing incidence). The usual range for angle of incidence is from 0° to 75°.

The colorimetric coefficients of the optical article of the invention in the international colorimetric system CIE L*a*b* (1976) (such as the Chroma C* and the hue "h")) are calculated between 380 and 780 nm, taking the standard illuminant D 65 and the observer into account (angle of) 10°. The observer is a "standard observer" as defined in the international colorimetric system CIE L*a*b*. Indeed, in the CIE L*a*b* space, it is possible to express not only overall variations in color, but also in relation to one or more of the parameters L*, a and b*. This can be used to define new parameters and to relate them to the attributes of the visual sensation. Clarity, related to luminosity, is directly represented by the value of L*. Chroma: $C^*=(a^{*2}+b^2)^{1/2}$ defines the chromaticness. The angle of hue: h=tg−1 (b*/a*) (expressed in degrees); related to hue.

The average transmittance factor, abbreviated Tm, is such as defined in ISO 13666:1998 standard, and measured according to ISO 8980-4 standard (generally at an angle of incidence of less than 17°, typically of) 15°, i.e. it represents the spectral transmission (unweighted) average within the whole light spectrum of from 400 nm to 700 nm.

By analogy, an average transmission factor also called "luminous transmission" of the system, is defined between 445 nm to 1185 nm, abbreviated "$T_m$ (445-1185)", which corresponds to the spectral transmission (unweighted) average within the wavelength range from 445 nm to 1185 nm.

In the present description, unless otherwise specified, transmittances/transmissions are measured at the center of the optical article for a thickness ranging from 0.7 to 2 mm, preferably from 0.8 to 1.5 mm, at an angle of incidence ranging from 0° to 15°, preferably 0°. As used herein, the light transmitted refers to light arriving on the front main face of the optical article and that went through the lens.

Herein, the "luminous reflectance" noted Ry, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

In the present application, the "mean reflection factor," noted $R_{m\ (X-Y)}$, is such as defined in the ISO 13666:1998 Standard, and measured in accordance with the ISO 8980-4 Standard, i.e. this is the (non weighted) spectral reflection average over the electromagnetic spectrum between the wavelength "X" and "Y" nm. According the invention, $R_m$ is measured for different angle of incidence.

For instance, the characteristic mean reflection factor for wavelengths ranging from 900 nm to 1000 nm, noted $R_{m\ (900-1000)}$ is defined by the formula and assuming a measurement step of 1 nm:

$$R_{m(900-1000)} = \frac{\int_{900}^{1000} R(\lambda)d\lambda}{1000 - 900}$$

wherein R(λ) represents the reflection factor at wavelength λ.

$R_{m\ (900-1000)}$ can be measured for any angle of incidence θ, based on R(λ) measured at the same angle of incidence.

Also, according to the invention, the maximum reflectance over the whole spectrum ranging from 400 nm to 1200 nm or ranging from 445 nm to 1185 nm, noted $R_{max\ (400-1200)}$ Or $R_{max\ (445-1185)}$, respectively, corresponds to the maximum reflectance value (highest value) measured on the whole spectrum ranging from 400 nm to 1200 nm or 445 nm to 1185 nm, respectively.

2. Optical Article

The optical article according to the present invention is a transparent optical article, preferably a lens or lens blank, and more preferably an ophthalmic lens or lens blank. The optical article may be coated on its convex main side (front side), concave main side (back side), or both sides with the multilayered antireflective coating of the invention.

A°) the Substrate

Generally speaking, the interferential multilayered coating of the optical article according to the invention, which may be an antireflective coating (called hereafter AR coating), may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from Bisphenol A or phthalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co) polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR 39®), allylic and (meth)acrylic copolymers, having a refractive index between 1,54 and 1,58, polymer and copolymer of thiourethane, polycarbonates are preferred.

The substrate may be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following a substrate means either a bare substrate or such a coated substrate.

Preferably, the substrate and the optional abrasion-resistant coating and/or a scratch-resistant coating generally coated onto said substrate have a similar/close refractive index so as to avoid fringes or cosmetic defects.

Prior to depositing the antireflective coating, the surface of said substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

B°) the Multilayered Antireflective Coating

The multilayered antireflective coating of the invention will be now described hereafter.

As previously mentioned, the multilayered antireflective coating of the invention is a broadband antireflective coating from wavelengths ranging from 445 nm to 1185 nm, therefore going approximately to the visible region to the NIR region and this for a high angle of incidence, especially higher than or equal to 45°.

Indeed, the multilayered antireflective coating has a mean reflection factor for wavelengths ranging from 445 nm to a predetermined maximum wavelength higher than or equal to 1185 nm, noted $R_{m\ (445-\geq1185)}$, that is lower than or equal to 2.9%, preferably lower than or equal to 2.8%, especially preferably lower than or equal to 2.7%, and typically preferably lower than or equal to 2.6% at an angle of incidence lower than or equal to 45°.

In general, the predetermined maximum wavelength ranges from 1185 nm to 1200 nm and may correspond for instance to 1185 nm or 1200 nm.

In particular, the mean reflection factor for wavelengths ranging from 445 nm to 1185 nm, noted $R_{m\ (445-1185)}$ is lower than or equal to 2.9%, preferably lower than or equal to 2.8%, especially preferably lower than or equal to 2.7%, and typically preferably lower than or equal to 2.6% at an angle of incidence lower than or equal to 45°.

According to a characteristic of the invention, the multilayered interferential coating has a mean reflection factor $R_{m\ (445-\geq1185)}$ that is lower than or equal to 7%, preferably lower than or equal to 6.8%, especially preferably lower than or equal to 2.7%, and typically preferably lower than or equal to 2.6% at an angle of incidence lower than or equal to 60°.

According to another characteristic of the invention, multilayered interferential coating has a maximum reflectance over the whole spectrum ranging from 445 nm to 1185 nm, noted $R_{max\ (445-1185)}$ that is lower than or equal to 4.5%, preferably lower than or equal to 3% and typically lower than or equal to 2.55% at an angle of incidence of 0°.

As used herein, an interval lower than or equal to 4.5%, includes the following values and/or any intervals comprised between these values (limits included): 4.4; 4.3; 4.2; 4.1; 4.0; 3.9; 3.8; 3.7; 3.6; 3.5; 3.4; 3.3; 3.2; 3.1; 3.0; 2.9; 2.8; 2.7; 2.6; 2.5; 2.49; 2.48; 2.47; etc.

Hence, the Applicant has surprisingly discovered that the multilayered antireflective coating according to the invention shows enables to obtain both low reflectance in the visible region and in the NIR (445 to 1185 nm) and this whatever the angle of incidence (0° to) 60°. This surprising effect is shown in the examples below.

In addition, the multilayered antireflective coating according to the invention presents the advantage of having a good robustness and aesthetic appearance and this also whatever the angle of incidence. At it will be explained below, for low angles of incidence ranging from 0° to 30°, the chroma C* is equal to or below than 20 and for higher angles of incidence (higher than or equal to) 30°, the chroma C* is below than 10. Hence, the multilayered antireflective coating of the invention has good color achromaticity. Especially, the antireflective coating according to the invention has a residual reflected color which has few saturated color, so as overcome the variations of the perceived residual reflected color of the antireflective coating (by an observer) between two optical articles/lenses (comprising said antireflective coating) which may arise during the manufacturing process, especially at industrial scale.

In one embodiment, the multilayered antireflective coating according to the invention does not absorb in the visible and in the NIR region or not much, which means, in the context of the present application, that its minimum transmission factor between 445 to 1185, noted $T_{min\ (445-1185)}$, is higher than 92%, more preferably higher than 95%, even more preferably higher than 96% and most preferably higher than 97% and especially higher than 97.5% at an angle of incidence of 0°.

In particular, for an angle of incidence ranging from 0° to 15°, the transmission factor $T_{m\ (445-1185)}$ is preferably higher than 98%, more preferably higher than 98.6%.

In addition, for higher angle of incidence such as 60°, the transmission factor $T_{m\ (445-1185)}$ is preferably higher than 92.8%, more preferably higher than 93% and especially higher than 93.4%.

In particular, the multilayered antireflective coating according to the invention has also very low reflection between 900 to 1000 nm (that is to say, in the middle of the NIR region ranging from 780 to 1400 nm), and has also preferably a very low reflection between 900 to 1200 nm for different angles of incidence such as described below.

Indeed, the multilayered interferential coating has in particular a mean reflection factor for wavelengths ranging from 900 nm to 1000 nm, noted $R_{m\ (900-1000)}$ and preferably for wavelengths ranging from 900 nm to 1200 nm, noted $R_{m\ (900-1200)}$ that is lower than or equal to 1% at an angle of incidence lower than 35° or at an angle of incidence of equal to or lower than 30°.

As used herein, an interval lower than or equal to 1.0%, includes the following values and/or any intervals comprised between these values (limits included): 0.99; 0.98; 0.97; 0.96; 0.95; 0.94; 0.93; 0.92; 0.91; 0.90; 0.89; 0.85; 0.80; 0.79; 0.78; 0.77; 0.76; 0.75; 0.74; 0.73; 0.72; 0.70; etc.

For a higher angle of incidence, notably ranging from 35° to 45° such as 45°, the multilayered interferential coating has preferably a $R_{m\ (900-1000)}$ or a $R_{m\ (900-1200)}$, that is lower than or equal to 4%, preferably lower than or equal to 3% and typically lower than or equal to 2.0%.

As used herein, an interval lower than or equal to 4.0%, includes the following values and/or any intervals comprised between these values (limits included): 3.9; 3.8; 3.7; 3.6; 3.5; 3.4; 3.3; 3.2; 3.1; 3.0; 2.9; 2.8; 2.7; 2.6; 2.5; 2.49; 2.48; 2.47; 2.46; 2.45; 2.40; 2.38; 2.36; 2.34; 2.32; 2.3; 2.2; 2.1; 2.0; 1.9; 1.8; 1.7; 1.6; 1.5; 1.4; 1.3; 1.2; 1.1; etc.

In addition, for an even higher angle of incidence, of 60°, the multilayered interferential coating has preferably a $R_{m\ (900-1000)}$ or a $R_{m\ (900-1200)}$, that is lower than or equal to 9%, preferably lower than or equal to 7% and typically lower than or equal to 6% at an angle of incidence of 60°.

As used herein, an interval lower than or equal to 9%, includes the following values and/or any intervals comprised between these values (limits included): 9; 8.9; 8.7; 8.6; 8.5; 8.4; 8.3; 8.2; 8.1; 8.0; 7.9; 7.8; 7.6; 7.5; 7.4; 7.3; 7.2; 7.1; 7.0; 6.9; 6.8; 6.7; 6.6; 6.5; 6.4; 6.3; 6.2; 6.1; 6.0; 5.9; 5.8; 5.7; 5.6; 5.5; 5.4; etc.

The multilayered interferential coating is also characterized, especially for a high incidence angle ranging from 0° to 60°, especially ranging from 45° to 60°, by a ratio $R_{m\ (900-1000)}/R_{m\ (445-1185)}$ that is in general lower than or equal to 1.1 preferably lower than or equal to 1.0 and typically lower than or equal to 0.9. Here, $R_{m\ (900-1000)}$ is such as defined above and $R_{m\ (445\text{-}1185)}$ corresponds to the mean reflection factor for wavelengths ranging from 445 nm to 1185 nm.

In addition, the multilayered interferential coating is also characterized, especially for a high incidence angle ranging from 0° to 60°, especially ranging from 45° to 60°, by a ratio $R_{m\ (900\text{-}1200)}/R_{m\ (445\text{-}1185)}$ that is in general lower than or equal to 1.1 preferably lower than or equal to 1.0 and typically lower than or equal to 0.9. Here, $R_{m\ (900\text{-}1200)}$ is such as defined above and $R_{m\ (445\text{-}1185)}$ corresponds to the mean reflection factor for wavelengths ranging from 445 nm to 1185 nm.

In addition, the multilayered antireflective coating according to the invention has also very low reflection in the visible region and especially for wavelengths ranging from 400 to 700 nm and this for different angles of incidence such as described below.

Indeed, the multilayered interferential coating has advantageously a mean reflection factor for wavelengths ranging from 400 nm to 700 nm, noted $R_{m\ (400\text{-}700)}$ that is lower than or equal to 3.0%, preferably lower than or equal to 2.5%, and typically lower than or equal to 2.3%, at an angle of incidence equal to or lower than 45°.

As used herein, an interval lower than or equal to 4.0%, includes the following values and/or any intervals comprised between these values (limits included): 3.0; 2.9; 2.8; 2.7; 2.6; 2.5; 2.49; 2.48; 2.47; 2.46, 2.45, 2.40; 2.38; 2.36; 2.34; 2.32; 2.3; 2.2; 2.1; 2.0; 1.9; 1.8; 1.7; 1.6; 1.5; 1.4; 1.3; 1.2; 1.1; etc.

Furthermore, as mentioned above, the multilayered interferential coating of the invention has smooth perceived residual color variation according to the angle of incidence θ.

Indeed, according to a characteristic of the invention, the multilayered interferential coating has preferably a Chroma C* of reflected light (measured according to the international colorimetric system CIE L*a*b* with the standard illuminant D65) that is lower than or equal to 20 at an angle of incidence below 30° (such as ranging from 0° to) 15°. For the same angle of incidence, the Chroma C* is in general higher than or equal to 8, in particular higher than or equal to 9.

In parallel, for angles of incidence below 30°, especially ranging from 0° to 15°, the variation of the hue "h" (e.g. the hue value at 0° and the hue value at) 15°, named hereafter $\Delta_{h\ (0°\text{-}15°)}$, is very short. Indeed, $\Delta_{h\ (0°\text{-}15°)}$ is generally equal to or below 10, preferably equal to or below 9 and typically equal to or below 5.

The multilayered interferential coating is also characterized in that it has preferably a Chroma C* of reflected light that is lower than or equal to 10, preferably lower than or equal to 6.8 and typically lower than or equal to 6 for an angle of incidence higher than or equal to 30°, preferably for an angle of incidence ranging from 45° to 65°. For the same angle of incidence, the Chroma C* is in general higher than or equal to 0.5, in particular higher than or equal to 1.

For these angles of incidence, the hue between different angles of incidence 30°, 45° and 60° varies slightly. However, since the Chroma C* is very low, these hue changes do not appear for an observer.

Hence, as it will be illustrated in the examples below, the hue h of the antireflective coating is substantially constant (variation of hue "Δh" is very low), that is to say typically between 280° to 320°, for an angle of incidence varying ranging from 0° to 15°. Indeed, the perceived residual reflected color when the angle of incidence varying from 0 to 15° is the "same" for an observer having a normal vision and this even if the Chroma is ranging from 8 to 20. When the hue of the antireflective coating begins to vary for an angle of incidence higher than or equal to 30° (such as 30°, 45° and) 60°, the Chroma C* is very low (lower than or equal to 10), that is to say the perceived residual reflected color is very pale such that the residual reflected color is not perceptible or hardly noticeable for an observer. Hence, the residual reflected color of the antireflective coating of the lens according to the invention is homogeneous whatever the angle of incidence. Therefore, it has good aesthetic performances (smooth color variation according to the angle of incidence).

Hence, the antireflective coating according to the invention has a residual reflected color which has few saturated color, so as overcomes the variations of the perceived residual reflected color of said antireflective coating (by an observer) between two lenses (comprising said antireflective coating) which may arise during the manufacturing process, especially at industrial scale.

Without being bound by any theories, it seems that the presence of at least two local maximums or peaks (i.e. as shown on FIG. 2a and FIG. 2b, two maximum wavelengths for lenses 1 to 4 according to the invention and three maximum wavelengths for lens 5 according to the invention) in the visible region ranging from 380 to 780 nm for the AR coating of the invention enable to obtain a better color enhancement and/or balancing properties and this even at very low angles of incidence and therefore enable to obtain a better color achromaticity. It seems that the two or three local maximums can compensate for each other in order to give a reflection that has less of saturated color. For instance, comparative example 1 (for an angle of incidence of) 0° has a Chroma C* of 25, whereas the example 1 according to the invention is close to 18. This is close to half of the Chroma C* of the comparative example 1 and thus, the color of the AR coating according to the invention is much less visible and present. It seems also that the two local maximums would slightly impact the image that is carried to the eye of the wearer and it would be easier to compensate color distortion effects with this double level.

Different structures of the multilayered antireflective coating of the invention will be now described.

As previously mentioned, the multilayered antireflective coating of the invention comprises a stack of at least two layers made of dielectric materials having a high refractive index (HI) and a low refractive index (LI).

Preferably, the antireflective coating comprises at least two layers, more preferably at least three layers with a low refractive index (LI), and at least two layers, more preferably at least three layers with a high refractive index layer (HI). It is here a simple stack, since the layer total number in the antireflective coating is higher than or equal to 4 and in general lower than or equal to 14.

According to a characteristic of the invention, the layer total number in the antireflective coating is higher than or equal to 4, more preferably higher than or equal to 6, typically higher than or equal to 7, in particular higher than or equal to 8 and may be higher than or equal to 10.

According to another characteristic of the invention, the layer total number in the antireflective coating is lower than or equal to 14, more preferably lower than or equal to 12, even more preferably lower than or equal to 10.

As used herein, a layer of the antireflective coating is defined as having a thickness higher than or equal to 1 nm. Thus, any layer having a thickness lower than 1 nm will not be considered when counting the number of layers in the antireflective coating. A sub-layer such as described hereafter either is not considered when counting the number of layers of the antireflective coating.

HI layers and LI layers don't need to alternate with each other in the stack, although they also may, according to one embodiment of the invention. Two HI layers (or more) may be deposited onto each other, as well as two LI layers (or more) may be deposited onto each other.

In general, the HI layers and LI layers alternate with each other in the stack of the AR coating according to the invention.

Advantageously, the multilayered interferential coating comprises alternately HI layers and LI layers and has a number of layers higher than or equal to 4, preferably higher than or equal to 6.

Preferably, the antireflective coating total thickness is lower than or equal to 650 nm, more preferably lower than or equal to 600 nm and even more preferably lower than or equal to 560 nm. The antireflective coating total thickness is generally higher than 300 nm, preferably higher than or equal to 320 nm. Typically, the physical thickness of said antireflective coating is ranging from 320 to 560 nm.

As used herein, an interval lower than or equal to 650 nm includes the following values and/or any intervals comprised between these values (limits included): 650; 600; 550; 540; 530; 520; 510; 500; 490; 480; 470; 480; 470; 460; 450; 440; 430; 420; 410; 400; 390; 380; 370; 360; 350; 340; 330; 320; 310; 300, etc.

Unless stated otherwise, all thicknesses disclosed in the present application relate to physical thicknesses.

According to a characteristic of the invention, the multilayered interferential (AR) coating comprises at least, in the direction moving towards said substrate (from the air to the substrate) the following "general structure":

L1: one LI layer having a physical thickness of from 95 nm to 130 nm, preferably from 100 nm to 120 nm;
L2: one HI layer having a physical thickness of from 30 nm to 60 nm, preferably from 40 nm to 50 nm;
L3: one LI layer having a physical thickness of from 5 nm to 25 nm, preferably from 8 nm to 20 nm;
L4: one HI layer having a physical thickness of from 80 nm to 130 nm, preferably from 90 nm to 125 nm;
L5: one LI layer having a physical thickness of from 5 nm to 40 nm, preferably from 8 nm to 35 nm;
L6: one HI layer having a physical thickness of from 15 nm to 50 nm, preferably from 20 nm to 40 nm.

Especially, according to a first embodiment, the multilayered interferential (AR) coating comprises at least, in the direction moving towards said substrate (from the air to the substrate):

L1: one LI layer having a physical thickness of from 100 nm to 125 nm, preferably from 115 nm to 120 nm;
L2: one HI layer having a physical thickness of from 40 nm to 55 nm, preferably from 35 nm to 50 nm;
L3: one LI layer having a physical thickness of from 8 nm to 25 nm, preferably from 10 nm to 20 nm;
L4: one HI layer having a physical thickness of from 85 nm to 120 nm, preferably from 90 nm to 110 nm;
L5: one LI layer having a physical thickness of from 5 nm to 30 nm, preferably from 8 nm to 25 nm;
L6: one HI layer having a physical thickness of from 20 nm to 45 nm, preferably from 25 nm to 40 nm.

According to the general embodiment and the first embodiment, the multilayered interferential (AR) coating may also comprise additional layers, in the direction moving towards said substrate (from the air to the substrate):

L7: one LI layer having a physical thickness of from 15 nm to 55 nm, preferably from 20 nm to 50 nm;
optional L8: one HI layer having a physical thickness of from 3 nm to 35 nm, preferably from 5 nm to 30 nm;
, optional L9: one LI layer having a physical thickness of from 8 nm to 50 nm, preferably from 10 nm to 45 nm; and
optional L10: one HI layer having a physical thickness of from 1 nm to 10 nm, preferably from 1 nm to 5 nm.

According to a specific embodiment, the multilayered interferential (AR) coating may also comprise additional layers relative to the general structure described above, in the direction moving towards said substrate (from the air to the substrate), especially between the L6 HI layer and the substrate:

L7: one LI layer having a physical thickness of from 15 nm to 50 nm, preferably from 20 nm to 50 nm; more preferably from 40 nm to 50 nm;
L8: one HI layer having a physical thickness of from 5 nm to 30 nm, preferably from 10 nm to 30 nm; more preferably from 10 nm to 20 nm;
L9: one LI layer having a physical thickness of from 10 nm to 50 nm, preferably from 30 nm to 50 nm, more preferably from 40 to 50 nm; and
L10: one HI layer having a physical thickness of from 1 nm to 10 nm, preferably from 1 nm to 5 nm.

According to a second embodiment, the multilayered interferential coating of the invention may comprise a thick LI layer that is positioned the closest from the substrate. Especially, this layer is an additional LI layer relative to the general structure described above and corresponds to L7'. Hence, the multilayered interferential coating may comprise one additional LI layer that is positioned to the closest from said substrate and has a physical thickness higher than or equal to 180 nm, preferably ranging from 200 nm to 250 nm.

The Applicant has discovered that this thick LI layer L7' enables to act not only as on optical layer, but also as a layer that significantly increases the scratch resistance of the AR coating. In addition, this second embodiment has a very low reflection both in the visible region and in the NIR region (see Lens 5 according to the invention in the examples below).

In particular, according to this second embodiment, the multilayered interferential (AR) coating may comprise at least, in the direction moving towards said substrate (from the air to the substrate):

L1: one LI layer having a physical thickness of from 95 nm to 130 nm, preferably from 100 nm to 120 nm, typically from 110 to 115 nm;
L2: one HI layer having a physical thickness of from 30 nm to 60 nm, preferably from 40 nm to 50 nm, typically from 40 to 45 nm;
L3: one LI layer having a physical thickness of from 5 nm to 25 nm, preferably from 8 nm to 20 nm, typically from 8 to 15 nm;
L4: one HI layer having a physical thickness of from 80 nm to 130 nm, preferably from 90 nm to 125 nm, typically from 105 to 120 nm;
L5: one LI layer having a physical thickness of from 5 nm to 40 nm, preferably from 8 nm to 35 nm, typically from 28 to 35 nm;
L6: one HI layer having a physical thickness of from 15 nm to 50 nm, preferably from 20 nm to 40 nm, typically from 20 to 30 nm;
L7': one thick LI layer having a physical thickness of from 180 nm to 250 nm, preferably from 200 nm to 220 nm.

According to another characteristic of the invention, the AR coating may comprise an antistatic layer (also named electrically conductive layer) such as described below. In general, this antistatic layer is positioned in the direction moving away from the substrate below and preferably directly below the "LI outer layer", that is to say below L1.

According to the invention, the HI layer is a traditional high refractive index layer that is well known in the art. It generally comprises one or more metal oxides such as, without limitation, zirconia ($ZrO_2$), alumina ($Al_2O_3$), tantalum pentoxide ($Ta_2O_5$), praseodymium oxide ($Pr_2O_3$), praseodymium titanate ($PrTiO_3$), lanthanum oxide ($La_2O_3$), yttrium oxide ($Y_2O_3$), niobium oxide ($Nb_2O_5$), titanium dioxide ($TiO_2$) and mixtures thereof. The preferred materials include zirconia ($ZrO_2$), tantalum pentoxide ($Ta_2O_5$). According to a characteristic of the invention, the HI layer is zirconia ($ZrO_2$) (refractive index of 1.997). Optionally, the HI layers may further contain silica or other materials with a low refractive index, provided they have a refractive index higher than or equal to 1.55, preferably higher than or equal to 1.6 as indicated here above.

The LI layer is also well known and may comprise, without limitation, $MgF_2$, $SiO_2$, a mixture of silica and alumina, especially silica doped with alumina (the latter contributing to increase the antireflective coating thermal resistance), or a mixture thereof. The LI layer is preferably a layer comprising at least 80% by weight of silica, more preferably at least 90% by weight of silica, relative to the layer total weight, and even more preferably consists in a silica layer ($SiO_2$) (refractive index of 1.473). Optionally, the LI layers may further contain materials with a high refractive index or very high refractive index, provided the refractive index of the resulting layer is lower than to 1.55.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

As mentioned above, the ophthalmic lens of the invention may be made antistatic that is to say not to retain and/or develop a substantial static charge, by incorporating at least one electrically conductive layer into the stack present on the surface of the article.

The ability for a glass to evacuate a static charge obtained after rubbing with a piece of cloth or using any other procedure to generate a static charge (charge applied by corona . . . ) may be quantified by measuring the time it takes for said charge to dissipate. Thus, antistatic glasses have a discharge time of about a few hundred milliseconds, preferably 500 ms or less, whereas it is of about several tens of seconds for a static glass. In the present application, discharge times are measured according to the method exposed in the French application FR 2 943 798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the antireflective properties thereof are not affected. It is preferably located between two layers of the antireflective coating, and/or is adjacent to a layer with a high refractive index of such antireflective coating. Preferably, the electrically conductive layer is located immediately under a layer with a low refractive index of the antireflective coating, most preferably is the penultimate layer of the antireflective coating by being located immediately under the silica-based outer layer of the antireflective coating: e.g. the "LI outer layer".

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

Generally, the electrically conductive layer contributes, within the stack, but in a limited manner, because of its low thickness, to obtain antireflective properties and represents a layer with a high refractive index in the antireflective coating. This is the case for those layers made from an electrically conductive and highly transparent material such as ITO layers.

The antireflective coating does not comprise any layer with a thickness higher than or equal to 20 nm, preferably higher than 15 nm, based on indium oxide. When a plurality of indium oxide-based layers are present in the antireflective coating, their total thickness is preferably lower than 20 nm, more preferably lower than 15 nm. As used herein, an indium oxide-based layer is intended to mean a layer comprising at least 50% by weight of indium oxide relative to the layer total weight.

According to a preferred embodiment, the antireflective coating does not comprise any layer with a thickness higher than or equal to 20 nm, preferably higher than 15 nm, comprising indium oxide, tin oxide or zinc oxide. When a plurality of layers comprising indium oxide, tin oxide or zinc oxide are present in the antireflective coating, their total thickness is preferably lower than 20 nm, more preferably lower than 15 nm.

C°) Sub-Layer

In one embodiment of the present invention, the antireflective coating may be deposited onto a sub-layer. It should be noted that such sub-layer does not belong to the antireflective coating.

As used herein, a sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying substrate (which is generally the anti-abrasion and anti-scratch coating or the bare substrate).

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor $\tau_v$. Its thickness is generally lower than 300 nm, more preferably lower than 200 nm, and is generally higher than 90 nm, more preferably higher than 100 nm.

The sub-layer preferably comprises a $SiO_2$—based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this $SiO_2$—based layer is a silica layer doped with alumina, in amounts such as defined here above, preferably consists in a silica layer doped with alumina.

In a particular embodiment, the sub-layer consists in a $SiO_2$ layer.

A sub-layer of the single layer type will be preferably used. However, the sub-layer may be of the multilayer type, especially when the sub-layer and the underlying substrate have a substantially different refractive index. This applies especially when the underlying substrate, has a high refractive index, i.e. a refractive index higher than or equal to 1.55, preferably higher than or equal to 1.57.

In this case, the sub-layer may comprise, in addition to a 90-300 nm-thick layer, called the main layer, preferably at most three additional layers, more preferably at most two additional layers, interleaved between the optionally coated substrate and such 90-300 nm-thick layer, which is generally a silica-based layer. These additional layers are preferably thin layers, which function aims at limiting the reflections at the sub-layer/underlying coating interface or sub-layer/substrate interface, as appropriate.

A multilayered sub-layer preferably comprises, in addition to the main layer, a layer with a high refractive index and with a thickness lower than or equal to 80 nm, more preferably lower than or equal to 50 nm and most preferably lower than or equal to 30 nm. Such layer with a high refractive index is directly contacting the substrate with a high refractive index or the underlying coating with a high refractive index, as appropriate. Of course, this embodiment may be used even if the substrate (or the underlying coating) has a refractive index lower than 1.55.

As an alternative, the sub-layer comprises, in addition to the main layer and to the previously mentioned layer with a high refractive index, a layer made of a $SiO_2$-based material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 30 nm, onto which is deposited said layer with a high refractive index. Typically, in this instance, the sub-layer comprises, deposited in this order onto the optionally coated substrate, a 25 nm-thick $SiO_2$ layer, a 10 nm-thick $ZrO_2$ or $Ta_2O_5$ layer and thereafter the sub-layer main layer.

According to an embodiment, the antireflective coating is not deposited onto a sub-layer such as described above. For instance, for the second embodiment of the AR coating according to the invention, the optical article does not comprise in general a sublayer.

D°) Process

The various layers of the antireflective coating and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating and of the optional sub-layer is conducted by evaporation under vacuum.

E°) Other Functional Layers

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 µm, preferably from 3 to 5 µm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions are compositions based on polyurethanes and compositions based on latexes, especially polyurethane type latexes optionally containing polyester units.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 µm, preferably of from 0.5 to 1.5 µm.

The ophthalmic lens according to the invention may also comprise coatings formed on the antireflective coating and capable of modifying the surface properties thereof, such as hydrophobic and/or oleophobic coatings (antifouling top coat). These coatings are preferably deposited onto the outer layer of the antireflective coating. As a rule, their thickness is lower than or equal to 10 nm, does preferably range from 1 to 10 nm, more preferably from 1 to 5 nm.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an ophthalmic lens according to the invention comprises a substrate that is successively coated on its rear face with an impact-resistant primer layer, an anti-abrasion and scratch-resistant layer, an anti-UV, antireflective coating and with a hydrophobic and/or oleophobic coating, or with a hydrophilic coating which provides antifog properties, or an antifog precursor coating.

The front face of the substrate of the ophthalmic lens may be successively coated with an impact-resistant primer layer, an abrasion-resistant layer and/or a scratch-resistant layer, an antireflective coating according to the invention, and with a hydrophobic and/or oleophobic coating.

The optical article according to the invention is preferably an ophthalmic lens, such as spectacle lens, or a blank for spectacle lens. The lens may be a polarized lens, a photochromic lens or a solar lens, which may be tinted or not, be corrective, or not.

Hence, the present invention provides an antireflective coating with an improved conception, comprising a relatively thin stack made of layers, the thicknesses and materials of which have been selected so as to obtain satisfactory antireflective performances and a good compromise between very low reflection at the same times in the NIR region and in the visible region, while having robustness properties and good cosmetic appearance.

3. Optical Device

The present invention also relates to an optical device that will be described hereafter.

Especially, the optical device comprises a light source emitting at least in the deep red and near infrared region and the optical article such as defined above. Generally, the optical article is an ophthalmic lens and comprises all the characteristics described above, in combination or not, for the optical article according to the invention. In general, this optical article is or is incorporated in an eye tracking device, an augmented reality device or a virtual reality device.

For instance, the optical device may correspond to the one described in the patent application PCT/EP2019/074697.

In particular, the optical device according to the invention may comprise the ophthalmic lens (such as describes above) and a light source emitting in the deep red and near infrared region, that is to say at wavelengths ranging from 700 nm to 2500 nm.

The light source can for instance be a light-emitting diode (LED).

In order to detect light emitted from that source, it is possible to use a video camera sensitive to NIR wavelengths, for instance a camera of the CCD (Charge-Coupled Device) type or of the CMOS (Complementary Metal Oxide Semiconductor) type, without any deep red and NIR filter. As a variant, instead of a camera, an array of single deep red and NIR sensors or a PSD (Position Sensitive Detector) sensor or any other appropriate sensor can be used.

For instance, FIG. 1 shows a non-limiting example of an arrangement in an augmented reality device or virtual reality device comprising an optical device according to the invention.

The optical device comprises the ophthalmic lens 10 placed between, on one hand, the eye 14 of a user and on the other hand, a light optical element 12. The light optical element 12 can be for instance a waveguide having coupling means for coupling light into, and outcoupling means for outcoupling light towards the eye 14 of the user, so that the user can perceive a virtual image.

The horizontal arrows 11 going through the light optical element 12 and through the ophthalmic lens 10 represent light coming from the environment.

A deep red and NIR eye tracker is also included in the augmented reality device or virtual reality device. The deep red and NIR eye tracker comprises a deep red and NIR camera 16 and at least one deep red and NIR light source 18, which source 18 is comprised in the optical device according to the invention.

In the embodiment shown in FIG. 1, the sources 18 are placed between the light optical element 12 and the ophthalmic lens 10, while the camera 16 is placed in front of the light optical element 12.

As a variant, the camera 16 and the sources 18 could be placed in front of the light optical element 12.

As another variant, the light optical element 12 could be used both for providing a virtual image and for providing light illumination. Light reflected by the eye 14 can then come back to the light optical element 12 and be redirected to a deep red and NIR light sensor.

The ophthalmic lens 10 can provide an optical function to the user. It can for instance be a corrective lens, namely, a power lens of the spherical, cylindrical and/or addition type for an ametropic user, for treating myopia, hypermetropia, astigmatism and/or presbyopia. The lens 10 can have a constant power, so that it provides power as a single vision lens would do, or it can be a progressive lens having variable power.

It also comprises, on its rear main face and/or on its front main face, the above-mentioned AR coating having a very low reflectance both in the visible region and in the NIR region.

Hence, the antireflective coating is designed so that reflection in the deep red and NIR range is reduced, so that the camera 16 receives little light coming from reflection on the lens 10 whatever the angle of incidence (from 0° to) 60°.

The following examples illustrate the present invention in a more detailed, but non-limiting manner.

4. Examples

A°) General Procedures

The optical articles used in the examples comprise a lens substrate, having a 65 mm diameter, a refractive index of 1.60 (MR-8® lens from MITSUI) and a power of −2,00 diopters and a center thickness of 1.2 mm, coated on its front face with 3 µm thick hard coat having a refractive index of 1.59 (elis mithril 1.6 hardcoat).

The layers of the antireflective coating were deposited onto the front face of the tested lenses without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

B°) Test Procedure

The method for making optical articles/lenses comprises the step of introducing the substrate, coated with the anti-abrasion and scratch-resistant coating, into a vacuum deposition chamber, a step of pumping until a high-vacuum is obtained, a step of activating the front face of the substrate by means of an argon ion beam (anode current: 1 A, anode voltage: 100 V, neutralization current: 130 mA), turning the ion irradiation off, forming the various layers of the antireflective coating by successive evaporations on the rear face and last a ventilation step.

For comparison, two comparative examples have been reproduced: comparative example 1 (product Seecoat from Nikon) and comparative example 2 (PCT/EP2019/074697). Comparative example 1 comprises a sublayer made of $SiO_2$ coated onto the Mithril hardcoat 1.6 and comprises a layer of ITO (tin doped indium oxide) that is composed of 90% of indium oxide.

C°) Results

The structural characteristics and the optical performances of the ophthalmic lenses 1 to 5 obtained in the Examples 1 to 5 according to the invention and of comparative lenses 1 and 2 obtained in the Comparative Examples 1 to 2 (prior art) are detailed hereunder.

Figure 2A:
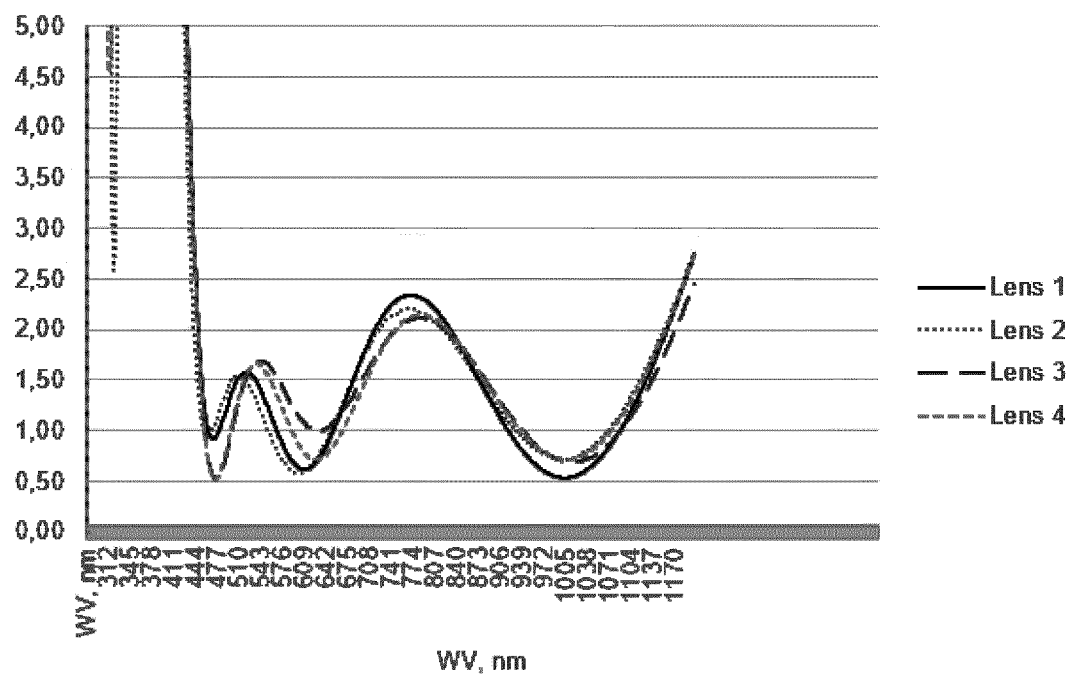
FIG. 2a shows the variation of the refection (R, %) on the front surface of lenses 1 to 4 according to the invention prepared in the examples 1 to 4, respectively, for the spectral function W(λ) at an angle of incidence of 0° as function of the wavelength in the visible region (380-780 nm) and in approximately the NIR region (780-1175 nm)
Figure 2B:
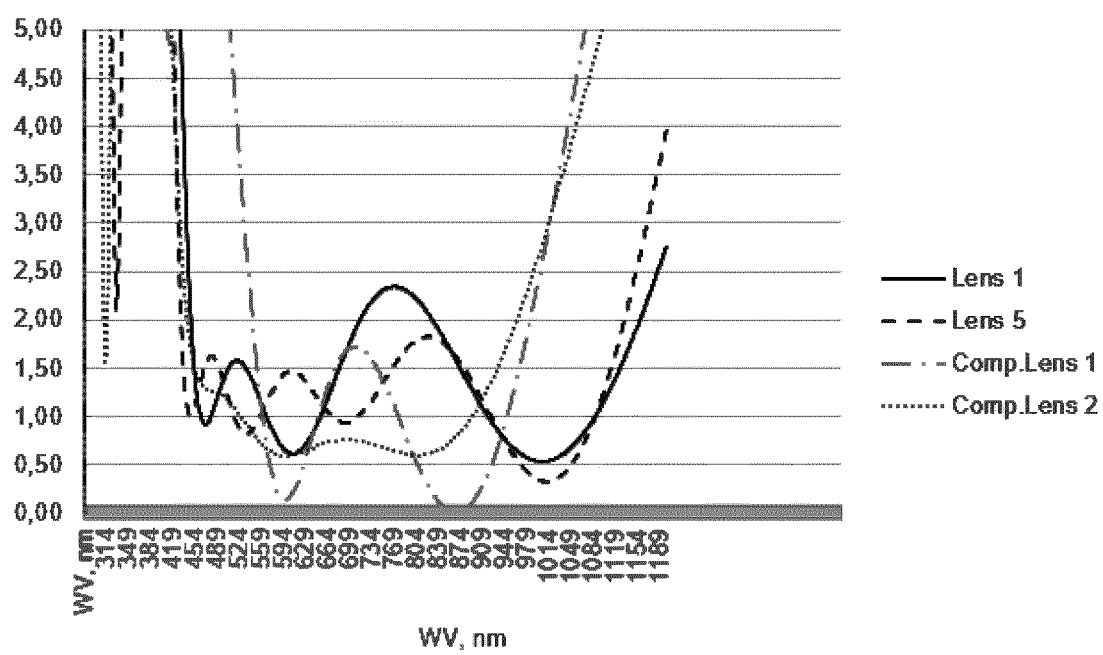
FIG. 2b shows the variation of the refection (R, %) on the front surface of lenses 1 and 5 according to the invention prepared in the examples 1 and 5, respectively, and of the comparative lenses 1 and 2 prepared in the comparative examples 1 and 2, respectively, for the spectral function W(λ) at an angle of incidence of 0° as function of the wavelength in the visible region (380-780 nm) and in approximately the NIR region (780-1175 nm).

The reflection graphs between 307 and 1175 nm of these lenses 1 to 5 and comparative examples 1-2 are illustrated on FIG. 2a and FIG. 2b, with angles of incidence of 0°.

The optical values are those of the front face. Factors Tm, Rm and Rmax of reflected light are provided for an angle of incidence of 0°, 15°, 30°, 45° and 60°, a standard illuminant D65 and a standard observer (angle) 10°.

Structures

The tested lenses 1 to 5 according to the invention and the comparative Lenses 1 and 2 have the following structure (in nm-physical thickness) in the direction moving from the air towards the substrate L1 to L10) ("Mat" means material):

TABLE 1

| Layer | Mat | Lens 1 | Lens 2 | Lens 3 | Lens 4 | Lens 5 | Comp. Lens 2 | Layer | Mat | Comp. Lens 1 |
|---|---|---|---|---|---|---|---|---|---|---|
| L1 | $SiO_2$ | 118.0 | 117.0 | 117.6 | 116.6 | 112.3 | 104.64 | L1 | $SiO_2$ | 104.6 |
| L2 | $ZrO_2$ | 45.9 | 47.5 | 42.2 | 45.8 | 42.2 | 158.01 | L2 | ITO | 6.7 |
| L3 | $SiO_2$ | 15.5 | 16.1 | 18.2 | 16.0 | 10.1 | 29.34 | L3 | $ZrO_2$ | 55 |
| L4 | $ZrO_2$ | 109.0 | 105.1 | 93.5 | 105.6 | 115.5 | 20.91 | L4 | $SiO_2$ | 9 |
| L5 | $SiO_2$ | 21.4 | 22.8 | 9.2 | 22.4 | 32.9 | — | L5 | $ZrO_2$ | 56 |
| L6 | $ZrO_2$ | 30.6 | 37.4 | 28.9 | 36.6 | 24.1 | — | L6 | $SiO_2$ | 32 |
| L7 or L7' | $SiO_2$ | — | 45.0 | 23.6 | 44.3 | 215.7 | — | L7 | $ZrO_2$ | 24 |
| L8 | $ZrO_2$ | — | 6.7 | 25.6 | 13.7 | — | — | — | — | — |
| L9 | $SiO_2$ | — | — | 14.7 | 43.9 | — | — | — | — | — |
| L10 | $ZrO_2$ | — | — | — | 2.2 | — | — | — | — | — |
| Sublayer | — | — | — | — | — | — | — | Sublayer | $SiO_2$ | 150 |

Substrate coated with mithril 1.6

Reflectance Ranging from 445 to 1185 nm

TABLE 2

| DESIGN NAME | Rmax (maximum reflectance) 0° | Rm (average reflectance) | | | | |
|---|---|---|---|---|---|---|
| | | 0° | 15° | 30° | 45° | 60° |
| Lens 1 | 2.47 | 1.33 | 1.36 | 1.58 | 2.55 | 6.49 |
| Lens 2 | 2.50 | 1.35 | 1.38 | 1.61 | 2.58 | 6.51 |
| Lens 3 | 2.48 | 1.35 | 1.37 | 1.58 | 2.53 | 6.45 |
| Lens 4 | 2.47 | 1.34 | 1.37 | 1.59 | 2.58 | 6.52 |
| Lens 5 | 1.82 | 1.12 | 1.14 | 1.30 | 2.19 | 6.05 |
| Comp. Lens 1 | 8.84 | 2.69 | 2.79 | 3.23 | 4.54 | 8.81 |
| Comp. Lens 2 | 5.02 | 1.42 | 1.50 | 1.86 | 3.05 | 7.26 |

It could be observed from this table 2 that Lenses 1 to 5 according to the invention have very good antireflective properties both in the visible and in the NIR region whatever the angle of incidence (from 0° to) 60° versus the lenses according to the prior art.

Indeed, the maximum reflectance at an angle of incidence of 0° is very low for wavelengths ranging from 445 to 1185 nm: ranging from 1.82 (Lens 5) to 2.50 (Lens 2), whereas the maximum reflectance is 8.84% for Comparative Lens 1 and 5.02% for Comparative Lens 2.

In addition, the average reflectance Rm for the different angle of incidence 0°, 15°, 30°, 45° and 60° for wavelengths ranging from 445 to 1185 nm is very low as compared to the average reflectance of Comparative Lenses 1 and 2.

Transmission Ranging from 445 to 1185 nm

TABLE 3

| DESIGN NAME | Tmin (minimum transmission) 0° | Tm (average transmission) | | | | |
|---|---|---|---|---|---|---|
| | | 0° | 15° | 30° | 45° | 60° |
| Lens 1 | 97.53 | 98.67 | 98.64 | 98.42 | 97.45 | 93.51 |
| Lens 2 | 97.50 | 98.65 | 98.62 | 98.39 | 97.42 | 93.49 |
| Lens 3 | 97.52 | 98.65 | 98.63 | 98.42 | 97.47 | 93.55 |
| Lens 4 | 97.53 | 98.66 | 98.63 | 98.41 | 97.42 | 93.48 |
| Lens 5 | 98.18 | 98.88 | 98.86 | 98.70 | 97.81 | 93.95 |
| Comp. Lens 1 | 91.16 | 97.31 | 97.21 | 96.77 | 95.46 | 91.19 |
| Comp. Lens 2 | 94.98 | 98.58 | 98.50 | 98.14 | 96.95 | 92.74 |

As shown in table 3 above, the minimum transmission Tmin for wavelengths ranging from 445 to 1185 nm at an angle of incidence of 0° is higher for Lenses 1 to 5 of the invention than Comparative Lenses 1 and 2. In addition, it is also the same for the average transmission, especially at an angle of incidence of 60°.

Average Reflectance Ranging from 900 to 1200 nm

TABLE 4

| DESIGN NAME | Rm (average reflectance) | | | | | Rm (900-1200)/Rm (445/1185) | | | | |
|---|---|---|---|---|---|---|---|---|---|---|
| | 0° | 15° | 30° | 45° | 60° | 0° | 15° | 30° | 45° | 60° |
| Lens 1 | 0.77 | 0.73 | 0.77 | 1.56 | 5.50 | 0.58 | 0.54 | 0.49 | 0.61 | 0.85 |
| Lens 2 | 0.90 | 0.88 | 0.96 | 1.79 | 5.71 | 0.67 | 0.64 | 0.60 | 0.69 | 0.88 |
| Lens 3 | 0.96 | 0.92 | 0.95 | 1.69 | 5.51 | 0.71 | 0.67 | 0.60 | 0.67 | 0.85 |
| Lens 4 | 0.95 | 0.92 | 0.98 | 1.76 | 5.59 | 0.71 | 0.67 | 0.61 | 0.68 | 0.86 |
| Lens 5 | 0.73 | 0.65 | 0.57 | 1.21 | 5.01 | 0.65 | 0.57 | 0.44 | 0.55 | 0.83 |
| Comp. Lens 1 | 1.13 | 1.43 | 2.53 | 5.17 | 11.52 | 0.42 | 0.51 | 0.78 | 1.14 | 1.31 |
| Comp. Lens 2 | 1.80 | 2.00 | 2.76 | 4.68 | 10.06 | 1.26 | 1.33 | 1.48 | 1.53 | 1.38 |

Table 4 above shows that the average reflection Rm for wavelengths ranging from 900 to 1200 nm for the different angles of incidence 0°, 15°, 30°, 45° and 60° is lower for Lenses 1 to 5 of the invention than for Comparative examples 1 and 2.

Average Reflectance Ranging from 400 to 700 nm (Visible Region)

TABLE 5

| DESIGN NAME | Rm (average reflectance) | | | | |
|---|---|---|---|---|---|
| | 0° | 15° | 30° | 45° | 60° |
| Lens 1 | 2.29 | 2.07 | 1.69 | 2.05 | — |
| Lens 2 | 2.09 | 1.87 | 1.53 | 1.96 | — |
| Lens 3 | 2.22 | 2.03 | 1.70 | 2.08 | — |
| Lens 4 | 2.15 | 1.95 | 1.61 | 1.97 | — |
| Lens 5 | 1.92 | 1.69 | 1.35 | 1.82 | — |
| Comp. Lens 1 | 3.01 | 2.90 | 2.73 | 3.06 | — |
| Comp. Lens 2 | 1.48 | 1.34 | 1.12 | 1.51 | — |

Hue h° and Chrome C* in the Visible Region Ranging from 380 nm to 780 nm

TABLE 6

| DESIGN NAME | h° | | | | | C* | | | | |
|---|---|---|---|---|---|---|---|---|---|---|
| | 0° | 15° | 30° | 45° | 60° | 0° | 15° | 30° | 45° | 60° |
| Lens 1 | 290 | 285 | 272 | 0 | 19 | 18 | 14 | 6 | 4 | 6 |
| Lens 2 | 285 | 280 | 281 | 353 | 17 | 15 | 12 | 6 | 6 | 7 |
| Lens 3 | 300 | 295 | 171 | 119 | 54 | 15 | 10 | 3 | 5 | 3 |
| Lens 4 | 294 | 285 | 201 | 126 | 2 | 15 | 11 | 4 | 3 | 4 |
| Lens 5 | 310 | 314 | 330 | 123 | 115 | 12 | 9 | 4 | 3 | 4 |
| Comp. Lens 1 | 236 | 248 | 283 | 310 | 331 | 25 | 25 | 30 | 35 | 16 |
| Comp. Lens 2 | 287 | 286 | 294 | 339 | 51 | 15 | 13 | 9 | 4 | 3 |

It could be observed that the AR coatings of lenses 1 to 5 according to the invention enable to obtain a hue that is substantially constant for an angle of incidence varying ranging from 0° to 15°. Indeed, Δh (variation of hue) is very low and is ranging from 4 (Lens 5) to 9 (Lens 4). In parallel, the Chroma C* is lower than 20. Hence, the perceived residual reflected color when the angle of incidence varying from 0 to 15° is the "same" for an observer having a normal vision and this even if the Chroma is ranging from 8 to 20.

It could be also observed that for an angle of incidence higher than or equal to 30° (such as 30°, 45°) and 60°, the Chroma C* of the AR coatings of Lenses 1 to 5 is very low (lower than or equal to 10). Therefore, the perceived residual reflected color is very pale such that the residual reflected color is not perceptible or hardly noticeable for an observer and this, even if the hue varies.

Therefore, Lenses 1 to 5 have good aesthetic performances (smooth color variation according to the angle of incidence), especially as compared to Comparative Lens 1 (the residual reflected color is more saturated in color, i.e.: Chroma of 25 and is still high when hue varies).

Rm (400-700 nm) and Rv in the Visible Region Ranging from 380 nm to 780 nm

TABLE 7

| DESIGN NAME | Rv (%) | | | | | Rm (%) | | | | |
|---|---|---|---|---|---|---|---|---|---|---|
| | 0° | 15° | 30° | 45° | 60° | 0° | 15° | 30° | 45° | 60° |
| Lens 1 | 1.14 | 1.08 | 1.01 | 1.58 | 5.13 | 2.29 | 2.07 | 1.69 | 2.05 | 5.44 |
| Lens 2 | 1.03 | 0.97 | 0.93 | 1.53 | 5.13 | 2.09 | 1.87 | 1.53 | 1.96 | 5.42 |
| Lens 3 | 1.4 | 1.37 | 1.36 | 1.91 | 5.36 | 2.22 | 2.03 | 1.7 | 2.08 | 5.49 |
| Lens 4 | 1.28 | 1.23 | 1.18 | 1.66 | 4.98 | 2.15 | 1.95 | 1.61 | 1.97 | 5.4 |
| Lens 5 | 1.14 | 1.14 | 1.23 | 1.85 | 5.07 | 1.92 | 1.69 | 1.35 | 1.82 | 5.31 |
| Comp. Lens 1 | 2.09 | 1.79 | 1.22 | 1.48 | 5.17 | 3.01 | 2.9 | 2.73 | 3.06 | 5.9 |
| Comp. Lens 2 | 0.83 | 0.78 | 0.75 | 1.35 | 4.76 | 1.48 | 1.34 | 1.12 | 1.51 | 4.69 |

It could be observed that lenses 1 to 5 have very low Rv values in the visible region and this whatever the angle of incidence, especially as compared to the comparative example 1.

The invention claimed is:

1. An optical article comprising a transparent substrate with a front main face and with a rear main face, at least one of the main faces being coated with a multilayered interferential coating comprising a stack of at least one high refractive index layer (HI) having a refractive index higher than or equal to 1.55 and at least one low refractive index layer (LI) having a refractive index layer lower than 1.55, wherein said multilayered interferential coating has a mean reflection factor for wavelengths ranging from 445 nm to a predetermined maximum wavelength higher than or equal to 1185 nm, noted Rm (445-1185), that is lower than or equal to 2.9% at an angle of incidence lower than or equal to 45°; wherein said multilayered interferential coating comprises at least, in the direction moving towards said substrate: one LI layer having a physical thickness of from 95 nm to 130 nm; one HI layer having a physical thickness of from 30 nm to 60 nm; one LI layer having a physical thickness of from 5 nm to 25 nm; one HI layer having a physical thickness of from 80 nm to 130 nm; one LI layer having a physical thickness of from 5 nm to 40 nm; one HI layer having a physical thickness of from 15 nm to 50 nm; and wherein the multilayered interferential coating total thickness is lower than or equal to 650 nm.

2. The optical article of claim 1, wherein said multilayered interferential coating has a mean reflection factor $R_{m\ (445-\geq1185)}$ that is lower than or equal to 7% at an angle of incidence of 60°.

3. The optical article of claim 1, wherein said multilayered interferential coating has a maximum reflectance over the whole spectrum ranging from 445 nm to 1185 nm, noted $R_{max\ (445-1185)}$ that is lower than or equal to 4.5% at an angle of incidence of 0°.

4. The optical article of claim 3, wherein $R_{max\ (445-1185)}$ is lower than or equal to 3% at an angle of incidence of 0°.

5. The optical article of claim 1, wherein said multilayered interferential coating has a mean reflection factor for wavelengths ranging from 900 nm to 1000 nm, noted $R_{m\ (900-1000)}$, that is lower than or equal to 1% at an angle of incidence lower than 35°.

6. The optical article of claim 1, wherein said multilayered interferential coating has a mean reflection factor for wavelengths ranging from 900 nm to 1000 nm, noted $R_{m\ (900-1000)}$, or for wavelengths ranging from 900 nm to 1200 nm, noted $R_{m\ (900-1200)}$, that is lower than or equal to 4% at an angle of incidence ranging from 35° to 45°.

7. The optical article of claim 6, wherein $R_{m\ (900-1000)}$ or $R_{m\ (900-1200)}$ is lower than or equal to 3% at an angle of incidence ranging from 35° to 45°.

8. The optical article of claim 1, wherein said multilayered interferential coating has a mean reflection factor for wavelengths ranging from 900 nm to 1000 nm, noted $R_{m\ (900-1000)}$, or for wavelengths ranging from 900 nm to 1200 nm, noted $R_{m\ (900-1200)}$, that is lower than or equal to 9% at an angle of incidence of 60°.

9. The optical article of claim 8, wherein said $R_{m\ (900-1000)}$ or $R_{m\ (900-1200)}$ is lower than or equal to 7% at an angle of incidence of 60°.

10. The optical article of claim 1, wherein said multilayered interferential coating has, at an angle of incidence ranging from 0° to 60°, a mean reflection factor for wavelengths ranging from 900 nm to 1000 nm, noted $R_{m\ (900-1000)}$, and a mean reflection factor for wavelengths ranging from 445 nm to 1185 nm, noted $R_{m\ (445-1185)}$, such that the ratio: $R_{m\ (900-1000)}/R_{m\ (445-1185)}$ is lower than or equal to 1.1.

11. The optical article of claim 10, wherein the ratio: $R_{m\ (900-1000)}/R_{m\ (445-1185)}$ is lower than or equal to 1.0.

12. The optical article of claim 1, wherein said multilayered interferential coating has a Chroma C* of reflected light that is lower than or equal to 20 at an angle of incidence below 30° of the international colorimetric system CIE L*a*b* with the standard illuminant D65.

13. The optical article of claim 1, wherein said multilayered interferential coating has a Chroma C* of reflected light that is lower than or equal to 10 at an angle of incidence higher than or equal to 30° of the international colorimetric system CIE L*a*b* with the standard illuminant D65.

14. The optical article of claim 1, wherein said multilayered interferential coating comprises alternately HI layers and LI layers and has a number of layers higher than or equal to 4.

15. The optical article of claim 1, wherein said multilayered interferential coating comprises one additional LI layer that is positioned to the closest from said substrate and has a physical thickness higher than or equal to 180 nm.

16. The optical article of claim 15, wherein said one additional LI layer that is positioned to the closest from said substrate has a physical thickness within the range from 200 to 250 nm.

17. The optical article of claim 1, wherein said multilayered interferential coating comprises additional layers in the direction moving towards said substrate, between the HI layer having a physical thickness of from 15 nm to 50 nm and the substrate: one LI layer having a physical thickness of from 15 nm to 50 nm; one HI layer having a physical thickness of from 5 nm to 30 nm; one LI layer having a physical thickness of from 10 nm to 50 nm; and one HI layer having a physical thickness of from 1 nm to 10 nm.

18. The optical article of claim 1, wherein:
the at least HI layer comprises one or more metal oxides selected from zirconia ($ZrO_2$), titanium dioxide ($TiO_2$), alumina ($Al_2O_3$), tantalum pentoxide ($Ta_2O_5$), neodymium oxide ($NChhajedO_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$); and
the LI layer comprises silica ($SiO_2$).

19. An optical device comprising a light source emitting in the deep red and near infrared region, wherein it comprises the optical article defined in the claim 1, and in that it is an augmented reality device, a virtual reality device, or an eye tracking device.

* * * * *